(12) United States Patent
Huang et al.

(10) Patent No.: US 8,425,057 B2
(45) Date of Patent: Apr. 23, 2013

(54) PROJECTION MODULE AND ELECTRONIC DEVICE

(75) Inventors: Bo-Cheng Huang, Hsinchu (TW); Chih-Chien Lin, Hsinchu (TW); Wei-Szu Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 379 days.

(21) Appl. No.: 12/759,331

(22) Filed: Apr. 13, 2010

(65) Prior Publication Data

US 2010/0290012 A1 Nov. 18, 2010

Related U.S. Application Data

(60) Provisional application No. 61/213,185, filed on May 15, 2009.

(30) Foreign Application Priority Data

Oct. 5, 2009 (TW) .............................. 98133687 A

(51) Int. Cl.
G03B 21/14 (2006.01)
G03B 3/00 (2006.01)
G02B 15/14 (2006.01)
G02B 7/02 (2006.01)

(52) U.S. Cl.
USPC ........... 353/101; 353/100; 353/119; 359/676; 359/683; 359/694; 359/703; 359/704; 359/822

(58) Field of Classification Search .......... 353/100–101, 353/119; 359/679, 683–684, 691, 694, 703–704, 359/819, 826, 676–677, 822–823
See application file for complete search history.

(56) References Cited

U.S. PATENT DOCUMENTS

| | | | | |
|---|---|---|---|---|
| 5,177,638 | A * | 1/1993 | Emura et al. ................... | 359/704 |
| 6,416,184 | B1 | 7/2002 | Arai et al. | |
| 6,972,910 | B2 * | 12/2005 | Orimo et al. ................... | 359/694 |
| 7,165,848 | B2 | 1/2007 | Gishi | |
| 7,581,840 | B2 * | 9/2009 | Kim ............................... | 353/101 |
| 7,972,018 | B2 * | 7/2011 | Sajadi et al. ................... | 353/101 |
| 2005/0046810 | A1 * | 3/2005 | Nakamura ..................... | 353/102 |
| 2006/0203211 | A1 | 9/2006 | Kim | |
| 2009/0033882 | A1 * | 2/2009 | Solomon ......................... | 353/85 |

FOREIGN PATENT DOCUMENTS

| | | |
|---|---|---|
| JP | 2003-186083 | 7/2003 |
| TW | 553399 | 9/2003 |
| TW | 200845553 | 11/2008 |

OTHER PUBLICATIONS

"Office Action of Taiwn Counterpart Application" with English translation thereof, issued on Dec. 26, 2012, p1-p8.

* cited by examiner

*Primary Examiner* — Tony Ko
*Assistant Examiner* — Jori S Reilly-Diakun
(74) *Attorney, Agent, or Firm* — J.C. Patents

(57) ABSTRACT

A projection module adapted to be disposed in an electronic device is provided. The electronic device includes a main body and the projection module disposed in the main body. The projection module includes a chassis, a light source, a light valve, a first lens group, and a second lens group. The light source and the light valve are disposed on the chassis. The first lens group is fixed on the chassis. The second lens group is slidably assembled on the chassis and is disposed between the light valve and the first lens group. The light source is capable of providing a light beam, and the light beam is capable of emitting through the light valve, the second lens group, and the first lens group in sequence.

6 Claims, 4 Drawing Sheets

PROJECTION MODULE AND ELECTRONIC DEVICE

CROSS-REFERENCE TO RELATED APPLICATION

This application claims the priority benefits of U.S. provisional application Ser. No. 61/213,185, filed on May 15, 2009 and Taiwan patent application serial no. 98133687, filed on Oct. 5, 2009. The entirety of each of the above-mentioned patent applications is hereby incorporated by reference herein and made a part of specification.

BACKGROUND OF THE INVENTION

1. Field of the Invention

The invention relates to a projection module and an electronic device. More particularly, the invention relates to a projection module, wherein a lens group is fixed on a chassis, and an electronic device using the same.

2. Description of Related Art

A projection apparatus may project images onto a large screen to facilitate more people watching the images displayed on the screen at the same time. Therefore, the projection apparatus is generally used in public places such as companies, schools, or other places. Moreover, as family-used display products trend to be large-scaled, the projection apparatus is also widely used in general families, and becomes a commonly used electronic product in people's daily life.

With development of technology, electronic products are developed to have high speed, high performance, and design features of lightness, slimness, shortness and smallness. In this case, pico projectors (or mini projectors) have become a main stream in the market of personal digital products. Generally, a light source of the pico projector applies a light emitting diode (LED) or other solid state light sources to improve a total lumen of the pico projector, so as to improve a brightness of projected images. After the pico projector is produced, a size of the pico projector including a battery is similar to a size of a general mobile phone in the market. Even, the pico projector may be integrated in the mobile phone. Therefore, the pico projector has advantages of portability and no restriction of usage locations.

However, in a pico projector, a lens module of the pico projector is integrated, and then is disposed on the chassis, and when a focal length of the lens module is adjusted, the lens module is moved relatively to the chassis. Since shapes of the chassis and the lens module are complicated, it is not easy to design a mechanism having both features of a sealed state and a smooth movement, so that a gap is probably formed between the lens module and the chassis, and therefore dustproof capability between the lens module and the chassis is poor. Moreover, when the lens module is moved relatively to the chassis due to adjustment of the projection focal length, the appearance of the chassis may cause a visual harassment for the user.

Moreover, to ensure that the lens module is capable of being moved relatively to the chassis, in the mechanism, a moving space required by the lens module is generally reserved on the chassis. However the advantages of lightness, slimness, shortness and smallness of the pico projector or the mobile phone integrated with the pico project may be lost due to the moving space reserved on the chassis.

SUMMARY OF THE INVENTION

The invention is directed to a projection module having a dustproof function.

The invention is directed to an electronic device having design features of lightness, slimness, shortness, smallness and conciseness.

Additional aspects and advantages of the invention may be set forth in the description of the techniques disclosed in the invention.

One embodiment of the invention provides a projection module adapted to be disposed in an electronic device. The projection module includes a chassis, a light source, a light valve, a first lens group, and a second lens group. The light source and the light valve are disposed on the chassis. The first lens group is fixed on the chassis. The second lens group is slidably assembled on the chassis and is disposed between the light valve and the first lens group. The light source is capable of providing a light beam, and the light beam is capable of emitting through the light valve, the second lens group, and the first lens group in sequence.

Another embodiment of the invention provides an electronic device including a main body and a projection module disposed in the main body. The projection module includes a chassis, a light source, a light valve, a first lens group, and a second lens group. The light source and the light valve are disposed on the chassis. The first lens group is fixed on the chassis. The second lens group is slidably assembled on the chassis and is disposed between the light valve and the first lens group. The light source is capable of providing a light beam, and the light beam is capable of emitting through the light valve, the second lens group, and the first lens group in sequence.

In summary, the embodiment or the embodiments of the invention may have at least one of the following advantages. In the projection module and the electronic device of the embodiments, since the second lens group is slidably disposed between the light valve and the first lens group, and the first lens group is fixed on the chassis, the chassis and the first lens group are formed integrally. Therefore, the projection module and the electronic device have a dustproof function, and have a concise design in appearance.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
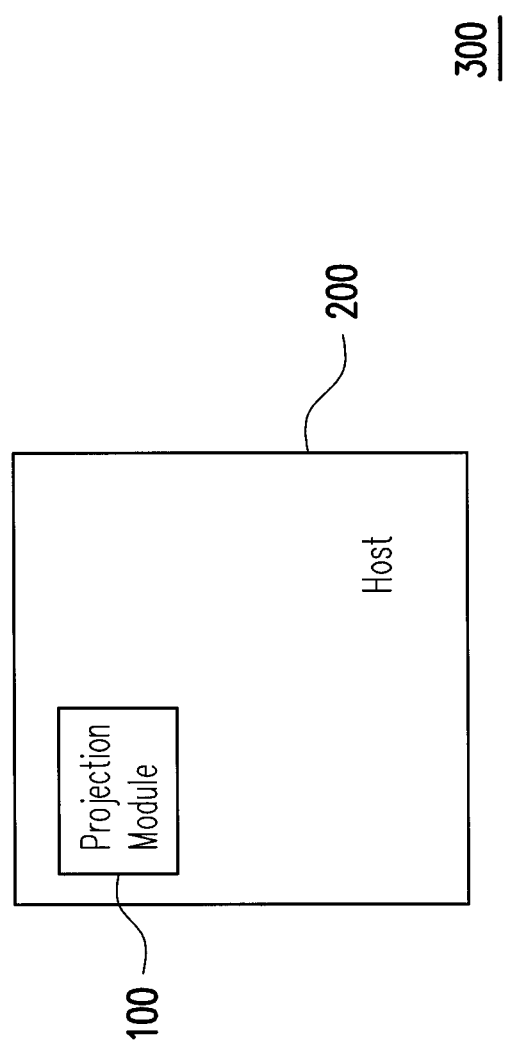
FIG. 1 is a block diagram illustrating an electronic device according to an embodiment of the invention.

Referring to FIG. 1, in the embodiment, an electronic device 300 is, for example, a mobile phone including a main body 200 and a projection module 100, wherein the projection module 100 is disposed in the main body 200. In the embodiment, the type of the electronic device 300 is not limited, and any electronic device integrated with the projection module 100 is suitable for the embodiment.

Figure 2:
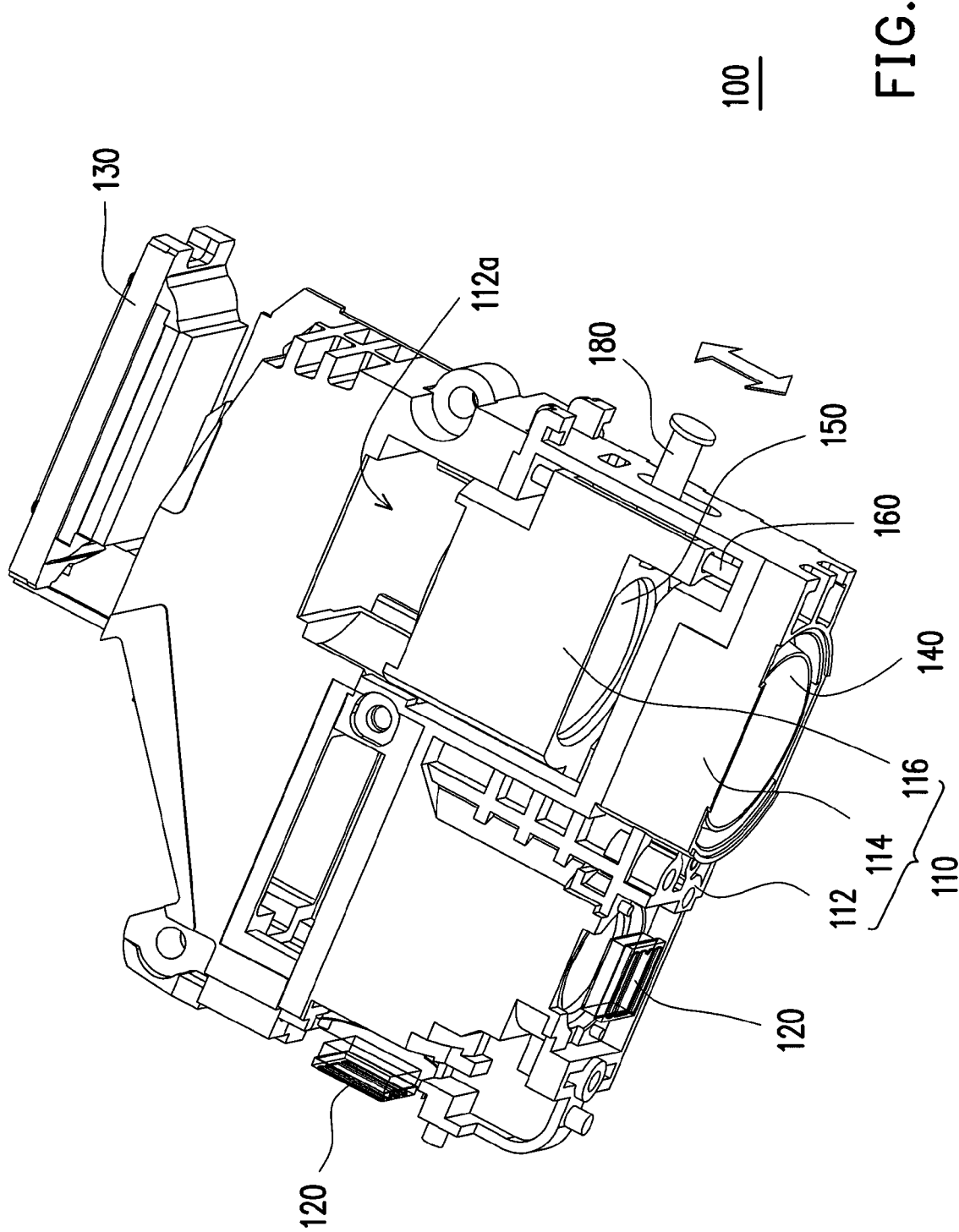
FIG. 2 is a perspective view illustrating the projection module according to an embodiment of the invention.
Figure 3:
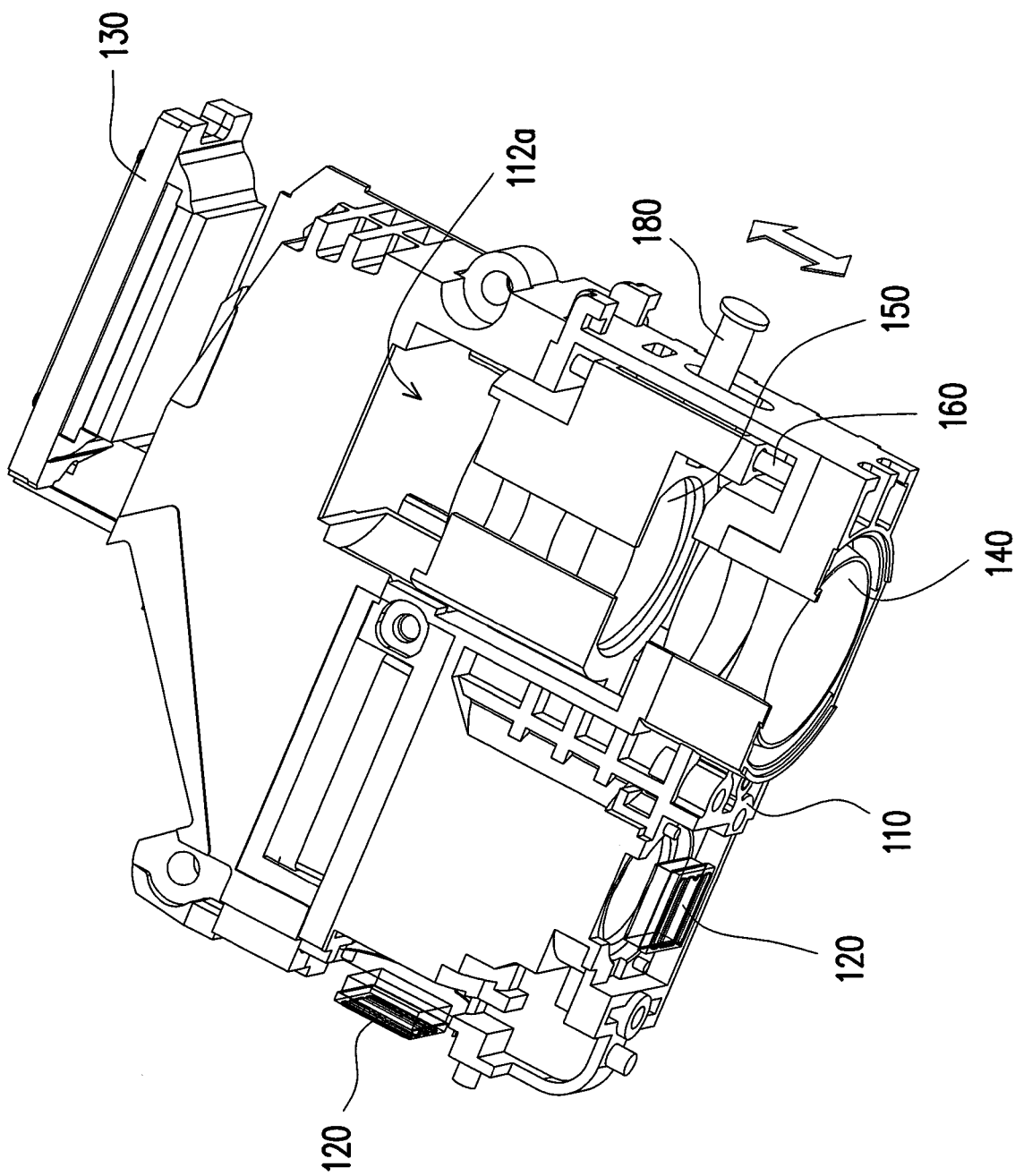
FIG. 3 is a perspective view illustrating the projection module of FIG. 2 with a part of elements removed.

Referring to FIG. 2 and FIG. 3, in the embodiment, the projection module 100 includes a chassis 110, a light source 120, a light valve 130, a first lens group 140, and a second lens group 150. The light source 120 and the light valve 130 are disposed on the chassis 110. The first lens group 140 is fixed on the chassis 110. The second lens group 150 is slidably assembled on the chassis 110 and is disposed between the light valve 130 and the first lens group 140. The light source 120 is capable of providing a light beam, and the light beam is capable of emitting through the light valve 130, the second lens group 150, and the first lens group 140 in sequence.

In the projection module 100 and the electronic device 300 of the embodiment, since the second lens group 150 is slidably assembled on the chassis 110, and the first lens group 140 and the chassis 110 are formed integrally, a focal length adjustment function of the projection module 100 may be maintained, dust may be isolated outside the chassis 110, and meanwhile the electronic device 300 may have a concise appearance.

In detail, referring to FIG. 2 and FIG. 3, the chassis 110 includes a body 112 and a first sleeve 114, wherein the first sleeve 114 is fixed to the body 112, and the first lens group 140 is fixed in the first sleeve 114. In the embodiment, during a fabrication of the chassis 110, the first sleeve 114 and the body 112 may be formed integrally, so that the fabrication procedures may be simplified and a gap between the chassis 110 and the first lens group 140 may be avoided.

In the embodiment, the chassis 110 further includes a second sleeve 116. The second lens group 150 is fixed in the second sleeve 116. The body 112 has a sliding slot 112a, and the second sleeve 116 is slidably disposed in the sliding slot 112a.

Figure 4:
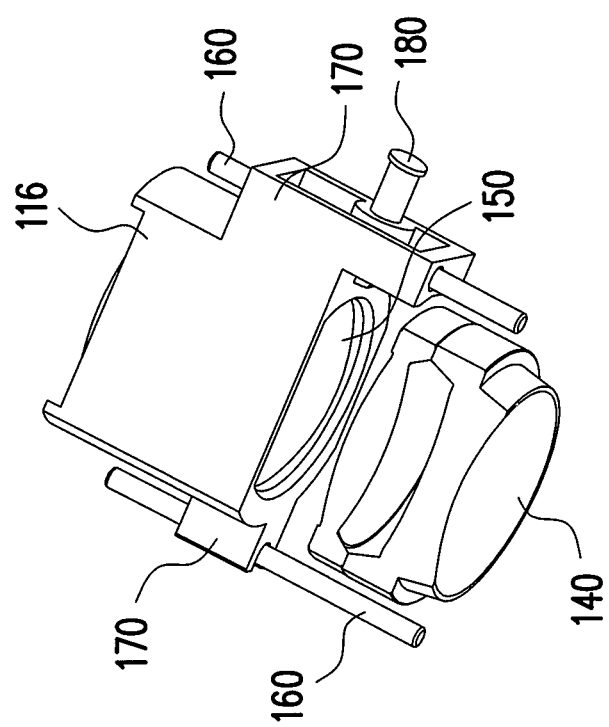
FIG. 4 is a partial enlarged view of the first lens group and the second lens group of the projection module of FIG. 2.

In FIG. 4, the chassis 110 is not illustrated, so that the illustrated elements may be clearly recognized. Referring to FIG. 2, FIG. 3 and FIG. 4, in the embodiment, the projection module 100 further includes two guiding rods 160 and two sliding blocks 170. The guiding rods 160 are fixed in the sliding slot 112a. The sliding blocks 170 are fixed to the second sleeve 116 and are respectively coupled to the guiding rods 160, so that the sliding blocks 170 may be moved along the guiding rods 160. In other words, the second sleeve 116 may be moved in the sliding slot 112a relatively to the body 112 according to a match of the guiding rods 160 and the sliding blocks 170, so that the focal length of the projection module 100 may be adjusted. Here, two guiding rods 160 and two sliding blocks 170 are taken as an example, the numbers of the guiding rods 160 and the sliding blocks 170 are not limited by the embodiment.

Moreover, the projection module 100 further includes a handle 180. The handle 180 is fixed to the second sleeve 116, and extends outside the chassis 110, so that the user may pull the handle 180 to slide the second sleeve 116 in the sliding slot 112a, so as to adjust the focal length of the projection module 100.

In summary, the embodiment or the embodiments of the invention may have at least one of the following advantages. In the projection module and the electronic device of the embodiment, since the first lens group is fixed on the chassis, and the second lens group is slidably assembled on the chassis, the focal length adjustment function of the projection module may be maintained, and dust may also be isolated outside the chassis. Meanwhile, since the second lens group is capable of sliding in the sliding slot of the chassis, a visual harassment for the user in appearance may be avoided, so that the electronic device may have the appearance features of lightness, slimness, shortness and smallness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection module adapted to be disposed in an electronic device, the projection module comprising:
   a chassis;
   a light source, disposed on the chassis;
   a light valve, disposed on the chassis;
   a first lens group, fixed on the chassis;
   a second lens group, slidably assembled on the chassis and disposed between the light valve and the first lens group, wherein the chassis comprises:
      a body;
      a first sleeve, fixed to the body, and the first lens group being fixed in the first sleeve; and
      a second sleeve, the second lens group being fixed in the second sleeve, the body having a sliding slot, and the second sleeve being slidably disposed in the sliding slot;
      a guiding rod, fixed in the sliding slot; and
      a sliding block, fixed to the second sleeve and linearly coupled to the guiding rod for sliding along the guiding rod, and wherein the light source is capable of providing a light beam, and the light beam is capable of emitting through the light valve, the second lens group, and the first lens group in sequence.

2. The projection module as claimed in claim 1, wherein the first sleeve and the body are formed integrally.

3. The projection module as claimed in claim 1, further comprising:
   a handle, fixed to the second sleeve, extending outside the chassis, and capable of being pulled to slide the second sleeve relatively to the body.

4. An electronic device, comprising:
   a main body;
   a projection module, disposed in the main body, and the projection module comprising:
      a chassis;
      a light source, disposed on the chassis;
      a light valve, disposed on the chassis;
      a first lens group, fixed on the chassis;
      a second lens group, slidably assembled on the chassis and disposed between the light valve and the first lens group, wherein the chassis comprises:
         a body;
         a first sleeve, fixed to the body, and the first lens group being fixed in the first sleeve; and
         a second sleeve, the second lens group being fixed in the second sleeve, the body having a sliding slot, and the second sleeve being slidably disposed in the sliding slot;
         a guiding rod, fixed in the sliding slot; and
         a sliding block, fixed to the second sleeve and linearly coupled to the guiding rod for sliding along the guiding rod, and wherein the light source is capable of providing a light beam, and the light beam is capable of emitting through the light valve, the second lens group, and the first lens group in sequence.

5. The electronic device as claimed in claim 4, wherein the first sleeve and the body are formed integrally.

6. The electronic device as claimed in claim 4, wherein the projection module further comprises:
   a handle, fixed to the second sleeve, extending outside the chassis, and capable of being pulled to slide the second sleeve relatively to the body.

* * * * *